United States Patent
Yun

(10) Patent No.: US 8,218,906 B2
(45) Date of Patent: Jul. 10, 2012

(54) IMAGE REGISTRATION EVALUATION

(75) Inventor: Il Dong Yun, Seongnam-si (KR)

(73) Assignee: Hankuk University of Foreign Studies Research and Industry-University Cooperation Foundation, Gyeonggi-do (KR)

( * ) Notice: Subject to any disclaimer, the term of this patent is extended or adjusted under 35 U.S.C. 154(b) by 994 days.

(21) Appl. No.: 12/195,350

(22) Filed: Aug. 20, 2008

(65) Prior Publication Data

US 2010/0046858 A1 Feb. 25, 2010

(51) Int. Cl.
G06K 9/00 (2006.01)
G06K 9/32 (2006.01)
(52) U.S. Cl. .................................. 382/294; 382/151
(58) Field of Classification Search .................. 382/128, 382/151, 294
See application file for complete search history.

(56) References Cited

U.S. PATENT DOCUMENTS

| | | | |
|---|---|---|---|
| 5,613,014 A | 3/1997 | Eshera et al. | |
| 6,611,615 B1* | 8/2003 | Christensen | 382/130 |
| 2007/0031063 A1* | 2/2007 | Zhou | 382/284 |
| 2007/0214100 A1* | 9/2007 | Marfatia et al. | 706/20 |
| 2008/0170770 A1* | 7/2008 | Suri et al. | 382/128 |
| 2008/0294644 A1* | 11/2008 | Liu et al. | 707/10 |

FOREIGN PATENT DOCUMENTS

JP 11-134499 5/1999

OTHER PUBLICATIONS

Geng, X. ("Transitive inverse-consistent image registration and evaluation," Ph.D. dissertation, the University of Iowa, Dec. 2007, Iowa Research Online).*
Yeung et al. ("Stochastic inverse consistency in medical image registration," MICCAI 2005, pp. 188-196).*
Skrinjar et al. ("Symmetric, transitive, geometric deformation and intensity variation invariant nonrigid image registration," IEEE Int'l Symposium on Biomedical Imaging, Apr. 15-18, 2004, V.1 920-923).*
Chou, Y.-Y. ("Transitive and symmetric nonregid image registration," Thesis, Georgia Institute of Technology, Apr. 2004).*

(Continued)

Primary Examiner — Yubin Hung
(74) Attorney, Agent, or Firm — NSIP Law

(57) ABSTRACT

An apparatus for evaluating image registration is provided. The apparatus includes a graph generation unit configured to generate a graph based on a plurality of registered images and a plurality of transformation rules therebetween, the graph comprising a plurality of nodes respectively corresponding to the registered images and a plurality of edges respectively corresponding to at least part of the transformation rules; a general transition unit configured to identify one or more loops for at least one of the nodes within the graph and to transform the registered image corresponding to the at least one node along the one or more identified loops to provide one or more transformed images; and a general transition error unit configured to produce a similarity measure between the registered image corresponding to the at least one node and at least one of the transformed images, wherein the graphic generation unit is further configured to calculate an inverse consistency metric for at least one pair of the registered images and a pair of transformations rules between the at least one registered image pair, and to establish as the edges the pair of transformation rules with an inverse consistency metric within a prescribed range.

18 Claims, 10 Drawing Sheets

OTHER PUBLICATIONS

Chou, Y.-Y. ("Transitive nonregid image registration—Application to cardiac MR image sequences," SPIE vol. 5370, 2004, pp. 1145-1151).*

Baker et al., "A Database and Evaluation Methodology for Optical Flow," In Proc. Eleventh IEEE Internat'l Conf. on Computer Vision (Oct. 2007).

Baker et al., "A Database and Evaluation Methodology for Optical Flow," http://vision.middlebury.edu/flow.

Collins, "Bio-Med 399-650: Advanced Imaging," Course Notes, Nonlinear Registration, McConnell Brain Imaging Centre, http://www.bic.mni.mcgill.ca/~louis/seminars/399-650/nl-reg/sld001.htm.

Gerig, "Medical Image Analysis, Lecture 6: Nonlinear Registration", UNC Psychiatry Medical Image Analysis Course (2000).

* cited by examiner

IMAGE REGISTRATION EVALUATION

TECHNICAL FIELD

The present disclosure relates generally to image processing and, more particularly, to image registration.

BACKGROUND

Image registration plays an important role in various multi-image analysis tasks such as change detection, image fusion, image restoration, etc. Image registration is the process of overlaying multiple images of the same object or scene taken at different times, from different viewpoints and/or by different sensors. To achieve the desired overlaying of multiple images, an arbitrary pair of the multiple images is aligned by applying a transformation rule reflective of a spatial relationship therebetween, where the transformation rule is used to transform one of the two images to the coordinate system of the other image.

Image registration has various applications. For example, in medicine, image registration may be used to overlay an image of a patient obtained from a sensor over a predetermined template image for diagnosis purposes (i.e., transform the acquired image to the coordinate system of the template image and overlay the transformed image onto the template image). Image registration enables an accurate comparison of the acquired image with respect to the template image and diagnosis of illness or disorder. In another example, multiple images of a scene taken from different perspectives may be transformed into the coordinate system of a selected reference image, so as to form a single mosaic image of the scene that is observed from the perspective of the reference image.

There are a large number of conventional image registration methods, such as area-based methods (e.g., cross-correlation methods, Fourier methods, mutual information methods, optimization methods, etc.) and feature-based methods (e.g., spatial relations methods, invariant descriptors methods, relaxation methods, etc.). However, there are only a handful of methods capable of objectively evaluating the performance or accuracy of these image registration algorithms. Many of these evaluation methods involve preparing, for example, a calibration (or control) data set and comparing how well the image registration algorithm produces accurate results in view of the calibration data set, which are not only time consuming but also costly to perform. Further, they do not provide an objective measure of the accuracy of a given image registration algorithm. This is particularly so as the number of images to be registered and then evaluated increases.

SUMMARY

Apparatuses and methods for evaluating image registration algorithms are provided. In one embodiment by way of non-limiting example, an apparatus for evaluating image registration comprises a graph generation unit, a general transition unit, and a general transition error unit. The graph generation unit is configured to generate a graph based on a plurality of registered images and a plurality of transformation rules therebetween, where the graph comprises a plurality of nodes respectively corresponding to the registered images and a plurality of edges respectively corresponding to at least part of the transformation rules. The general transition unit is configured to identify one or more loops for at least one of the nodes within the graph and to transform the registered image corresponding to the at least one node along the one or more identified loops to provide one or more transformed images. The general transition error unit is configured to produce a similarity measure between the registered image corresponding to the at least one node and at least one of the transformed images.

The Summary is provided to introduce a selection of concepts in a simplified form that are further described below in the Detailed Description. This Summary is not intended to identify key or essential features of the claimed subject matter, nor is it intended to be used in determining the scope of the claimed subject matter.

DETAILED DESCRIPTION

Figure 1:
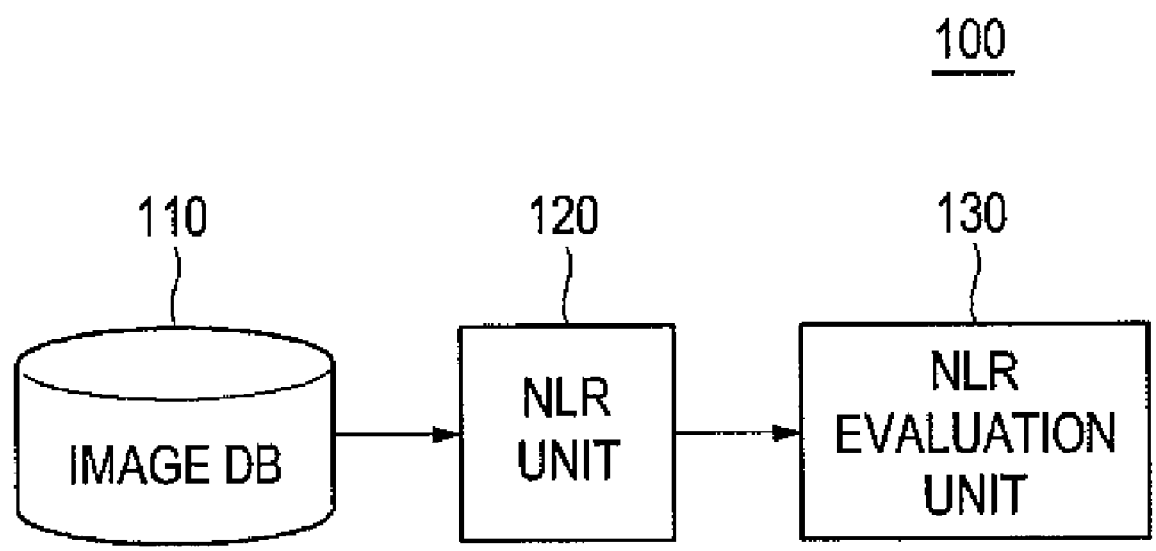
FIG. 1 is a schematic block diagram of an illustrative embodiment of a non-linear registration (NLR) system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the components of the present disclosure, as generally described herein, and illustrated in the Figures, may be arranged, substituted, combined, and designed in a wide variety of different configurations, all of which are explicitly contemplated and make part of this disclosure.

FIG. 1 is a schematic block diagram of an illustrative embodiment of a non linear registration (NLR) system 100. As shown in FIG. 1, the NLR system 100 includes an image database (DB) 110 for storing a plurality of image files, an NLR unit 120 for registering the images stored in the image DB 110, and an NRL evaluation unit 130 for evaluating the registration operation performed by the NLR unit 120.

In one embodiment, the image DB 110 may include a plurality of images of the same object or scene taken at different times, from different viewpoints and/or by different sensors. For example, the image DB 110 may be configured to include a plurality of images of a patient taken by a magnetic resonance imaging (MRI) device and a computer tomography (CT) device at different times. In other embodiments, the image DB 110 may be configured to include a plurality of images of different scenes or objects taken at different times from different viewpoints and/or by different sensors. For example, the image DB 110 may be configured to include a plurality of images of a patient as well as template images for diagnosis purposes (e.g., images of a healthy person).

The NLR unit 120 may be configured to retrieve multiple images stored in the image DB 110 for image registration. Based on the retrieved multiple images, the NLR unit 120 may generate one or more transformation rules or mapping functions. Each transformation rule is used for transforming one of the retrieved images (i.e., a target image) to the coordinate system of another of the retrieved images (i.e., a reference image). By applying a respective transformation rule, one image may be aligned or overlaid onto another image. The images, for which a transformation rule has been generated by the NLR unit 120, will be referred to as "registered images" herein.

The NLR evaluation unit 130 may be coupled to the NLR unit 120 to receive registered images and associated transformation rules, and evaluate the accuracy of the transformation rules generated by the NLR unit 120. By way of non-limiting example, the NLR evaluation unit 130 may receive four registered images A, B, C and D, and four transformation rules T(A→B), T(B→C), T(C→D) and T(D→A) (herein, T(x→y) denotes a transformation rule for transforming image x to the coordinate system of image y). Ideally, the sequential applications of the transformation rules T(A→B), T(B→C), T(C→D) and T(D→A) upon image A should result in a transformed image identical to original image A. However, due to the errors or imperfections in the transformation rules that are generated by the NLR unit 120, the transformed image may not always be completely identical to original image A.

For simplicity, a series of transformation rules that, when sequentially applied to an arbitrarily selected registered image, should nominally transform the registered image back to itself are referred to as "a transformation loop" of the registered image. Depending on the number of registered images and associated transformation rules that are received from the NLR unit 120, there may be more than one transformation loops for each of the received registered images. In one embodiment by way of non-limiting example, assuming there are four registered images A, B, C and D, and eight transformation rules T(A→B), T(B→C), T(C→D), T(D→A), T(A→D), T(D→C), T(C→B) and T(B→A). In this instance, there will be two transformation loops for image A (i.e., a first loop composed of T(A→B), T(B→C), T(C→D) and T(D→A), and a second loop composed of T(A→D), T(D→C), T(C→B) and T(B→A)).

Further, an image that has been generated by transforming a registered image along the transformation loop of the registered image is referred to as "a loop-transformed image." In case of the above example, the image that has been generated by transforming image A along the first and second loops may be respectively referred to as "first loop-transformed image A" and "second loop-transformed image A." Also, an act of sequentially transforming a registered image along a transformation loop is referred to as "loop-transforming."

In one embodiment, the NLR evaluation unit 130 may be configured to evaluate or quantify the accuracy of the transformation rules by comparing an original image and its loop transformed image. The comparison may involve (a) selecting at least one of the registered images that have been received by the NLR unit 120; (b) finding at least one transformation loop for the selected image; (c) loop-transforming the selected image to generate a loop-transformed image; and (d) computing a similarity measure or a difference measure (i.e., a dissimilarity measure) between the selected and loop-transformed images. Herein, the similarity measure refers to a function that associates a given pair of images with a numeric value, such that a higher numeric value indicates greater similarity. Further, herein, the difference measure refers to a function that associates a given pair of images with a numeric value, such that a lower numeric value indicates greater similarity.

Various conventional similarity or difference measures, such as distance-based similarity measures, feature-based similarity measures, etc., may be employed. In one embodiment, the NLR evaluation unit 130 may be configured to measure a difference, for example, a mean square error (MSE) between two images.

Figure 2:
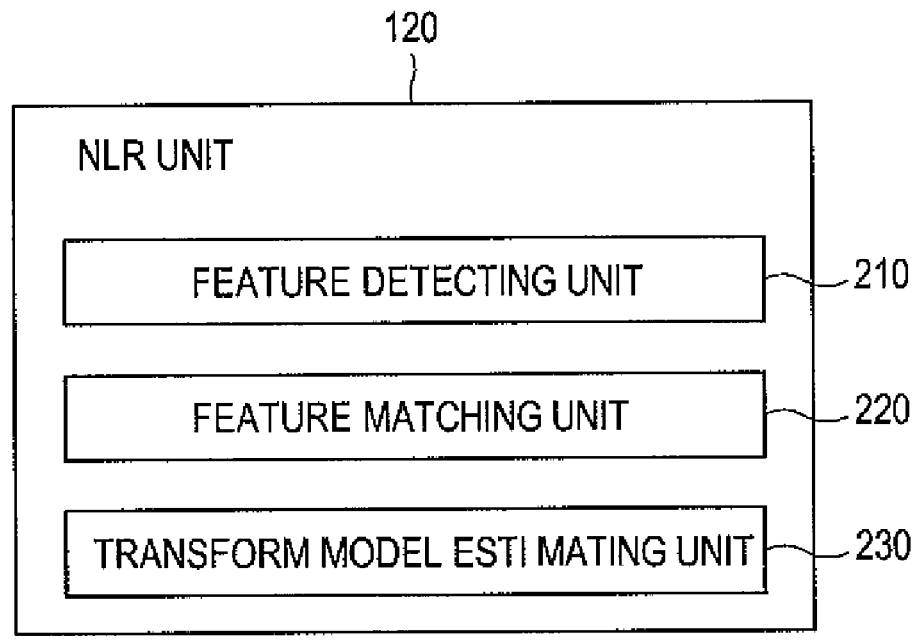
FIG. 2 is a block diagram of an illustrative embodiment of the NLR unit shown in FIG. 1.

FIG. 2 is a block diagram of an illustrative embodiment of the non-linear registration (NLR) unit 120 shown in FIG. 1. As shown in FIG. 2, the NLR unit 120 includes a feature detection unit 210, a feature matching unit 220, and a transform model estimating unit 230.

The feature detection unit 210 may be configured to retrieve two images (one as a target image and the other as a reference image) from the image DB 110 (see FIG. 1), and extract a predetermined type of objects in the two images. The predetermined type of objects may include regions (e.g., forests, lakes, fields, etc.), lines (e.g., region boundaries, coastlines, roads, rivers, etc.) or points (e.g., region corners, line intersections, points on curves with high curvature, etc.). Such objects may be distinct, spread throughout and efficiently detectable in the two images. The feature detection unit 210 may further be configured to establish as a control point (CP) at least one of the extracted points and/or at least one point in the extracted regions and/or lines. For example, an extracted point, a center of gravity of an extracted region or an end point or center of an extracted line may be established as a CP of an image.

The feature matching unit 220 may be configured to determine the correspondence between the CPs of the target image and the CPs of the reference image. Those skilled in the art will appreciate that various known methods may be employed to find such correspondence. Examples of such methods include a spatial relation method, an invariant descriptor method, a relaxation method, a pyramids and wavelets method, etc.

The transform model estimating unit 230 may be configured to establish a transformation rule or a mapping function that overlays the target image over the reference image. The transform model estimating unit 230 may select one of different transformation rules, as stored in its local memory or system memory (not shown), and estimate the parameters of the selected transformation rule. In establishing the transformation rule, the transform model estimating unit 230 may map the CPs of the target image as closely as possible to the corresponding CPs of the reference image. Those skilled in the art will appreciate that various known methods may be employed to establish such a transformation rule. Examples of such methods include a global mapping method, a local mapping method, a radial basis functions method, an elastic registration method, etc.

It will be appreciated that the NLR unit 120 described in conjunction with FIG. 2 is illustrative of only a few of the ways in which the NLR unit 120 may be implemented. It will be further appreciated that depending on the registration method employed by the NLR unit 120, one or more of the units in FIG. 2 may be omitted and/or one or more additional units may be added. In one embodiment by way of non-limiting example, for the embodiments of the NLR unit 120 that implement an area-based method (e.g., cross-correlation methods, Fourier methods, mutual information methods, optimization methods, etc.), the feature detection unit 210 may be omitted.

Figure 3:
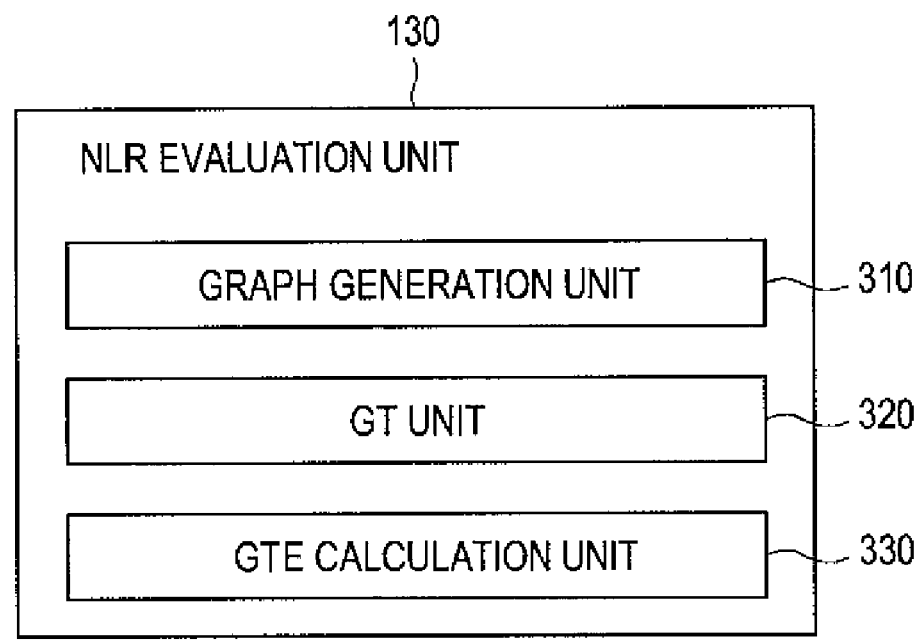
FIG. 3 is a block diagram of an illustrative embodiment of the NLR evaluation unit shown in FIG. 1.

FIG. 3 is a block diagram of an illustrative embodiment of the non-linear registration (NLR) evaluation unit 130 shown in FIG. 1. As shown in FIG. 3, the NLR evaluation unit 130 includes a graph generation unit 310, a general transition (GT) unit 320 and a general transition error (GTE) calculation unit 330.

The graph generation unit 310 may be configured to receive registered images and associated transformation rules from a NLR unit 120, and generate a graph that is comprised of nodes and edges, where each of the nodes corresponds to the respective image and each of the edges corresponds to the respective transformation rule. In one embodiment, the graph may be a directed graph (i.e., digraph). The digraph, as defined herein, is an ordered pair G:=(V, A), where V is a set whose elements are nodes and where A is a set consisting of directed edges e=(x, y, T). Here, x and y denote a node and T denotes a transformation rule that is designed to map the image corresponding to node x to the coordinate system of the image corresponding to node y. By edge e=(x, y, T), it is meant that node y is the head of the edge and node x is the tail of the edge, or alternatively that node y is a direct successor of node x and node x is a direct predecessor of node y.

The GT unit 320 may be configured to select at least one node among the graph generated by the graph generation unit 310, and identify a path within the graph that starts from and ends at the selected node (i.e., a graph loop). A graph loop for a node corresponds to a transformation loop of the registered image that corresponds to the node. The GT unit 320 may further be configured to transform the registered image corresponding to the selected node along the identified loop, thereby obtaining a loop-transformed image of the registered image.

The GTE calculation unit 330 may be configured to receive the registered images and their corresponding loop-transformed images, and compute a similarity measure or a difference measure between at least one of the registered images and the respective loop-transformed image. As mentioned above, the similarity or difference measure between two images may be obtained by calculating a mean square error (MSE) of the two images. In the mean square error scheme, the smaller the MSE, the more similar the two images.

There may be one or more loop-transformed images for a registered image, depending on the number of loops identified by the GT unit 320 for the node that corresponds to the registered image. In one embodiment, the GTE calculation unit 330 may evaluate the accuracy of the transformation rules based on at least a portion of the plurality of MSEs calculated for the registered images and their loop-transformed images.

Figure 4:
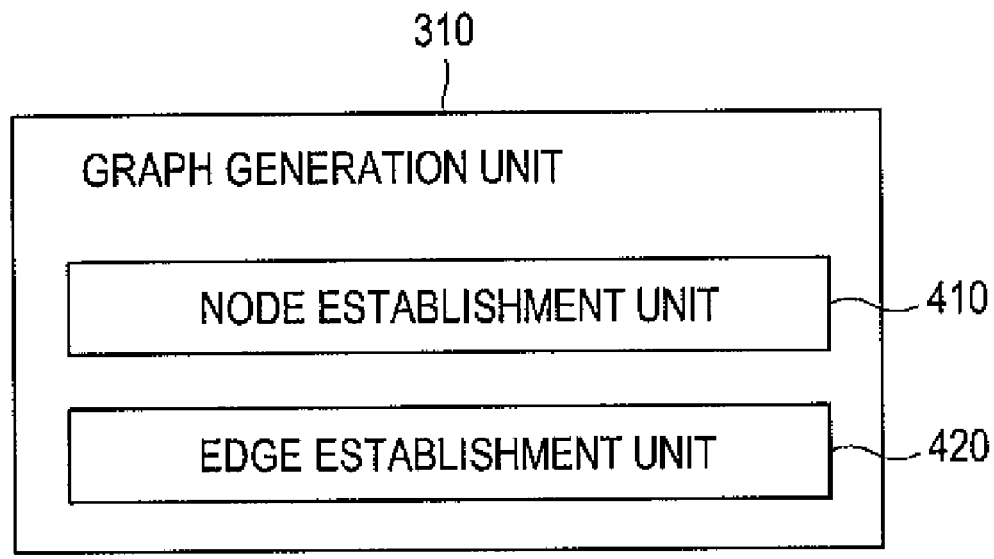
FIG. 4 is a block diagram of an illustrative embodiment of the graph generation unit shown in FIG. 3.

FIG. 4 is a block diagram of an illustrative embodiment of the graph generation unit 310 shown in FIG. 3. As shown in FIG. 4, the graph generation unit 310 includes a node establishment unit 410 and an edge establishment unit 420.

In order to generate a graph based on the registered images and the transformation rules received from the NLR unit 120 (see FIG. 1), the node establishment unit 410 may establish or set up at least a portion of the registered images as a node of the graph. In one embodiment, the node establishment unit 410 may be configured to establish all of the registered images received from the NLR unit 120 as the nodes of the graph.

In one embodiment, the edge establishment unit 420 may be configured to establish at least a portion of the received transformations rules as directional edges e=(x, y, T) of the graph, where x and y respectively denote nodes x and y, and where T denotes a transformation rule that is designed to map the image corresponding to node x to the coordinate system of the image corresponding to node y. The edge establishment unit 420 may establish the edge e(x, y, T) as an edge between nodes x and y, with nodes x and y being the tail and head of the edge.

In some embodiments, the edge establishment unit 420 may be configured to establish all of the received transformation rules as the edges of the graph. Alternately, the edge establishment unit 420 may be configured to establish as the edges of the graph only the transformation rules that satisfy a predetermined criterion. For example, the edge establishment unit 420 may compute an inverse consistency metric (ICM), i.e., an inverse consistency error (ICE) for a pair of transformation rules between nodes x and y (i.e., a forward transformation rule $T1(x, y)$ and a reverse transformation rule $T2(y, x)$), and establish as the edges of the graph the pair of transformation rules with the computed ICM that is within a prescribed range.

By definition, the forward and reverse transformation rules are inverse to one another, and thus, when an image is successively transformed by the forward and reverse transformation rules, the resulting image will be identical to the original image. Nevertheless, the forward and reverse transformation rules generated by many image registration algorithms, especially, non-rigid or non-linear algorithms, are not exactly inverse to one another. Theses algorithms are known to have difficulty in producing inverse-consistent transformation rules due to various known reasons, which are not described further herein. By reducing an acceptable ICE value, i.e., eliminating as many pairs of transformation rules as possible that are grossly inconsistent, the NLR evaluation unit 130 may save time and resources, which otherwise will be needlessly wasted.

Figure 5:
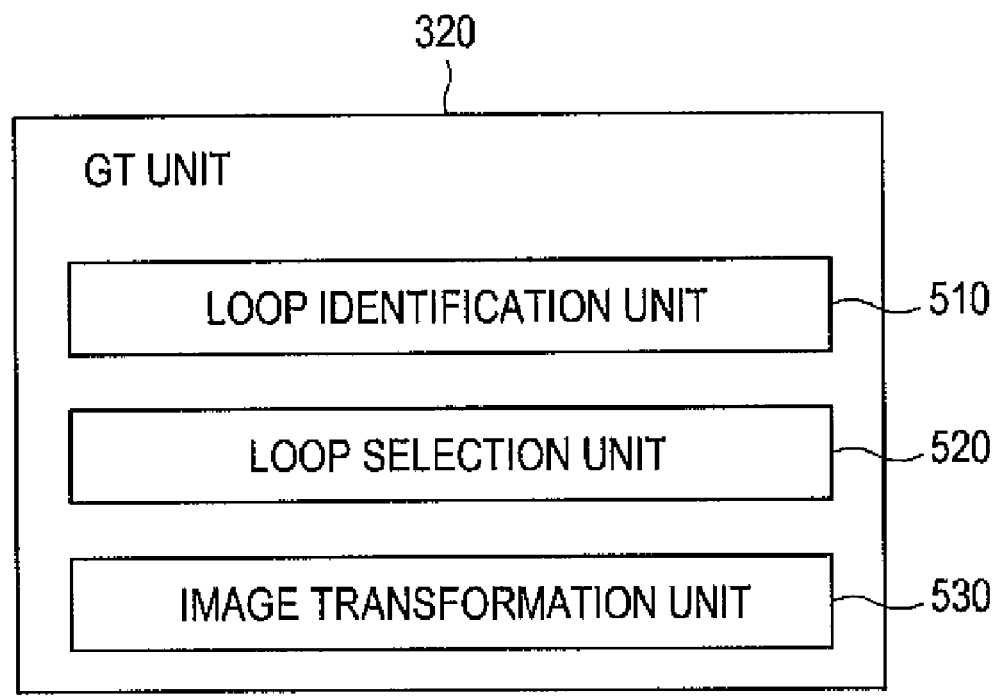
FIG. 5 is a block diagram of an illustrative embodiment of the general transition unit shown in FIG. 3.

FIG. 5 is a block diagram of an illustrative embodiment of the general transition (GT) unit 320 shown in FIG. 3. As shown in FIG. 5, the GT unit 320 includes a loop identification unit 510, a loop selection unit 520 and an image transformation unit 530.

The loop identification unit 510 may be configured to receive information regarding the generated graph, i.e., registered images and nodes corresponding thereto and pairs of edges between the nodes (pairs of transformation rules established between the nodes). In response, the loop identification unit 510 may identify one or more loops for at least one of the nodes included in the graph by using, for example, one of the known path finding algorithms. For example, starting from a given node, the loop identification unit 510 may keep track of the number of nodes traversed while sequentially searching for a next available succeeding node and advancing thereto. For ease of reference, the number of nodes traversed will be referred to as the "node count" of the identified loop.

The loop selection unit 520 may select at least one of the loops that are identified by the loop identification unit 510 for at least one of the nodes in the graph based on a predetermined criterion. In one embodiment, the loop selection unit 520 may be configured to select loops that pass through multiple nodes whose number is greater than a prescribed value. By way of non-limiting example, assuming there are 7 nodes in the graph, the loop selection unit 520 may select one or more loops that pass through more than 4 nodes. In another embodiment, the loop selection unit 520 may be configured to select one or more loops that pass through multiple nodes whose number is within a prescribed value range.

The image transformation unit 530 may be configured to transform the registered images corresponding to the nodes having at least one loop selected by the loop selection unit 520 along the respective loops. As a result, the image transformation unit 530 may produce loop-transformed images for the loops associated with the registered images.

Figure 6:
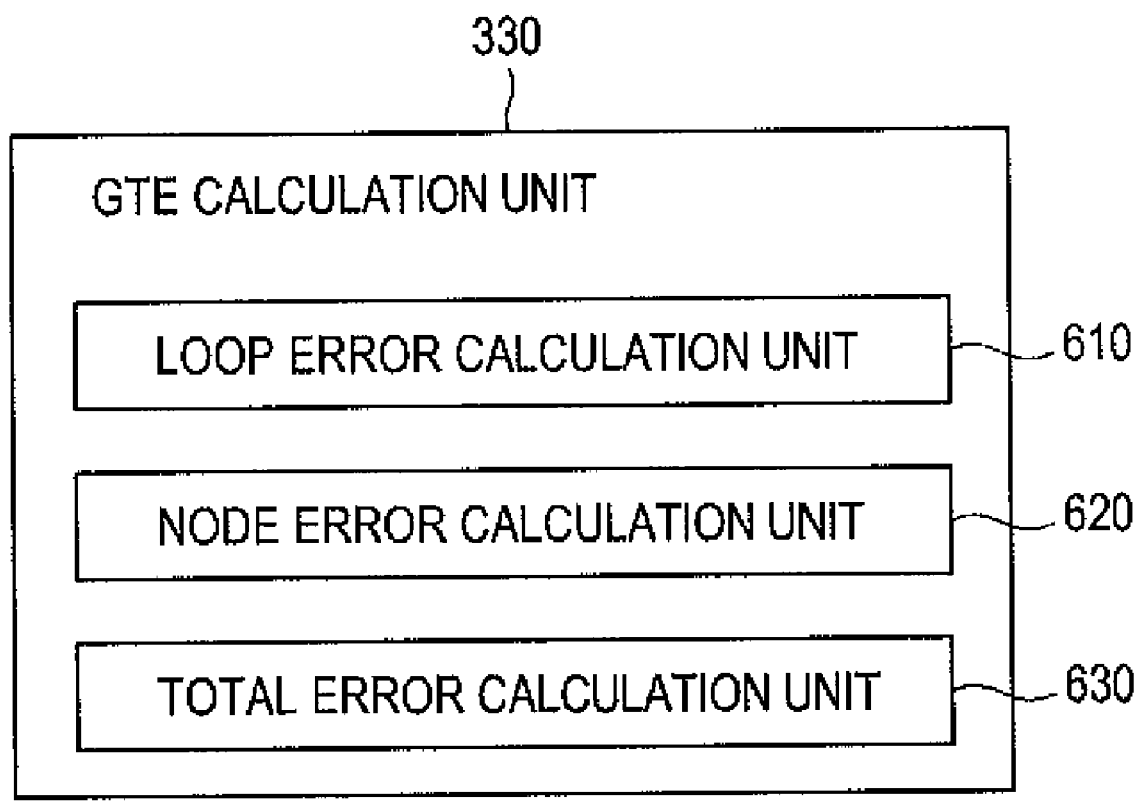
FIG. 6 is a block diagram of an illustrative embodiment of the general transition error calculation unit shown in FIG. 3.

FIG. 6 is a block diagram of an illustrative embodiment of the general transition error (GTE) calculation unit 330 shown in FIG. 3. As shown in FIG. 6, the GTE calculation unit 330 includes a loop error calculation unit 610, a node error calculation unit 620 and a total error calculation unit 630.

The loop error calculation unit 610 may be configured to calculate a similarity or difference measure between registered images and loop-transformed images that are received from the general transition (GT) unit 320. The similarity or difference measure between a registered image and a corresponding loop-transformed image is hereinafter referred to as "a loop error." In one embodiment, the loop error calculation unit 610 may calculate as a loop error the MSE between a registered image and its loop-transformed image. However, it will be appreciated that the loop error calculation unit 610 may employ any of the known similarity or difference measures and that those skilled in the art will select a measure that is appropriate for a particular implementation.

The node error calculation unit 620 may be configured to calculate a similarity or difference measure of a particular node in the graph by using the loop errors of the particular node that are computed by the loop error calculation unit 610. The similarity or difference measure related to a particular node in a graph is hereinafter referred to as "a node error." In one embodiment, the node error calculation unit 620 may compute the node error of a particular node by computing an arithmetic mean of the loop errors of the particular node. In another embodiment, the node error calculation unit 620 may compute the node error of a particular node by computing a weighted sum or average of the loop errors of the particular node. It should be appreciated that various methods may be employed in computing weights for the loop errors. In one example, the weight of a loop error may be set to be inversely proportional to the node count of the loop for which the loop error is computed. In this case, the weight for the loop error of the loop that traverses 3 nodes may be computed as $1/3$. In another example, the weight for a loop error may be set to be logarithmically proportional to the node count of the loop for which the loop error is computed.

The total error calculation unit 630 may be configured to calculate an overall performance measure of the graph based on at least some of the node errors that are calculated by the node error calculation unit 620. In one embodiment, the total error calculation unit 630 may evaluate the overall performance by computing an arithmetic mean of all node errors computed for the graph. In another embodiment, the total error calculation unit 630 may evaluate the overall performance by computing a weighted sum or average of the node errors computed for the graph. Hereinafter, an overall performance measure of a graph is referred to as "a total error" for the graph. It will be appreciated that various methods may be employed in computing the total error or weight for each of the node errors.

Figure 7:
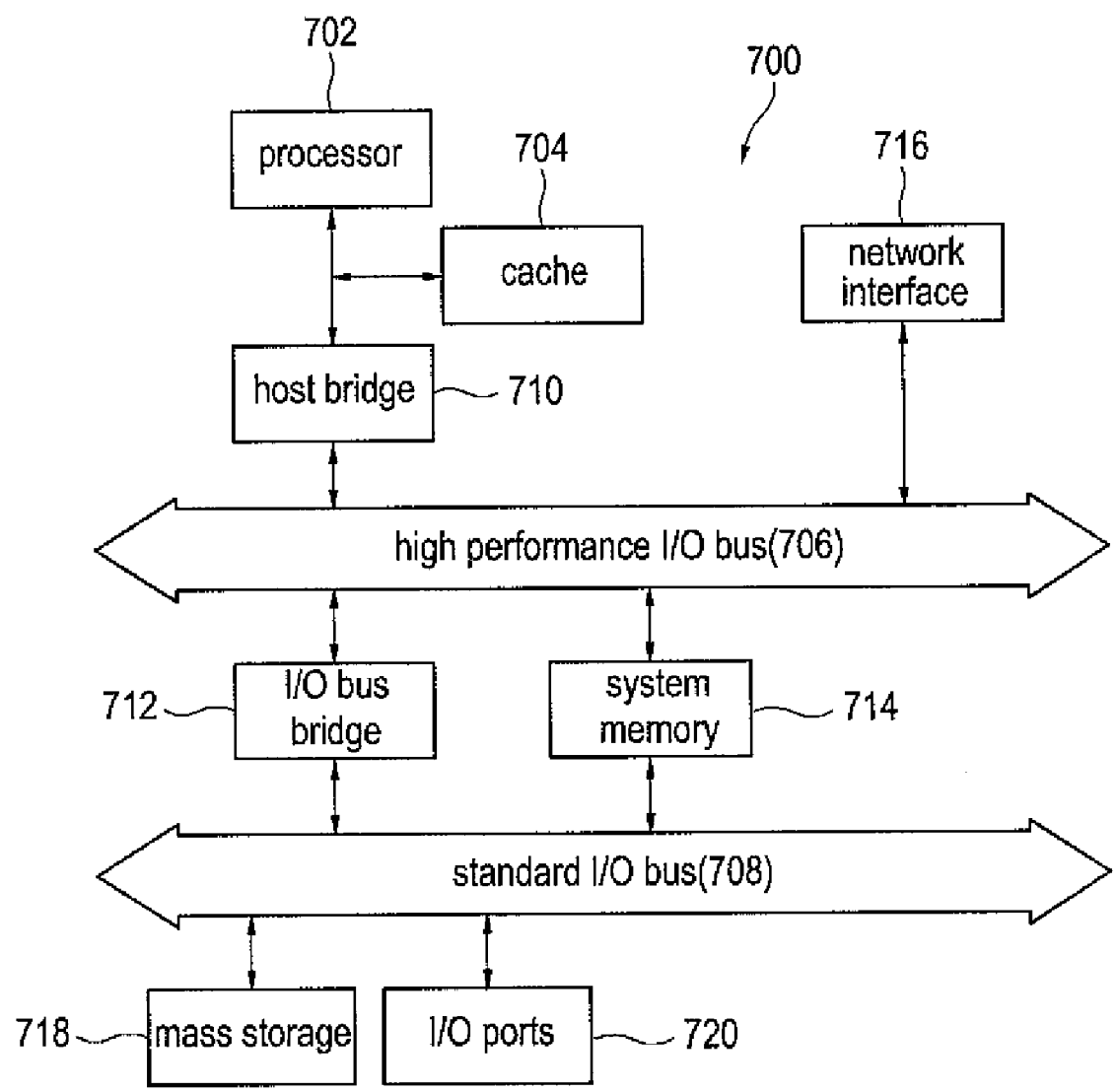
FIG. 7 is a schematic diagram of an illustrative embodiment of a computing system.

While a system of the present disclosure has been described above with reference to numerous embodiments, some or all of the elements or operations thereof may be implemented by using a computer system of a general-purpose hardware architecture. FIG. 7 is a schematic diagram of an illustrative embodiment of a computing system 700, which may be used to implement the above-described embodiments and which may be used to perform one or more of the processes or elements described herein. As shown in FIG. 7, the computing system 700 includes a processor 702, a cache memory 704 and one or more software applications and drivers directed to the functions described herein.

Additionally, the computing system 700 includes a high performance input/output (I/O) bus 706 and a standard I/O bus 708. A host bridge 710 couples the processor 702 to the high performance I/O bus 706, whereas the I/O bus bridge 712 couples the two buses 706 and 708 with each other. A system memory 714 and a network/communication interface 716 couple to the bus 706. The network interface 716 provides communication between the computing system 700 and any one of a wide range of networks such as an Ethernet network, etc. The computing system 700 may further include a video memory (not shown) and a display device coupled to the video memory. A mass storage 718 and I/O ports 720 are coupled to the bus 708. The computing system 700 may optionally include a keyboard and pointing device, as well as a display device (not shown) coupled to the bus 708.

The mass storage 718 provides permanent storage for the data and programming instructions to perform the above-described functions implemented in the non-linear registration (NLR) unit 120 (see FIGS. 1 and 2) and the NRL evaluation unit 130 (see FIGS. 1 and 3-6). The system memory 714 (e.g., DRAM) may provide temporary storage for the data and programming instructions being executed by the processor 702. Further, in the case of the image DB 110, the mass storage 718 may provide permanent storage for a plurality of images, and the system memory 714 may provide temporary storage for the image data. The I/O ports 720 are one or more serial and/or parallel communication ports that provide communication between additional peripheral devices, which may be coupled to the computing system 700.

The computing system 700 may include a variety of system architectures. Further, various components of the computing system 700 may be rearranged. For example, the cache 704 may be on-chip with the processor 702. Alternatively, the cache 704 and the processor 702 may be packed together as a "processor module," with the processor 702 being referred to as the "processor core." Furthermore, certain implementations of the present disclosure may not require or include all of the above components. For example, the peripheral devices shown coupled to the standard I/O bus 708 may be coupled to the high performance I/O bus 706. In addition, in some implementations, only a single bus may exist, with the components of the computing system 700 being coupled to the single bus. Furthermore, the computing system 700 may include additional components such as additional processors, storage devices or memories.

As discussed below, in one embodiment, the operations of the non linear registration (NLR) system 100 including the NLR unit 120 and the NLR evaluation unit 130 described herein may be implemented as a series of software routines executed by the computing system 700. These software routines may comprise a plurality or series of instructions to be executed by a processor in a computing system, such as the processor 702. Initially, the series of instructions may be stored in a storage device such as the mass storage 718. However, the series of instructions can be stored in any suitable storage medium such as a diskette, CD-ROM, ROM, EEPROM, etc. Furthermore, the series of instructions need not be stored locally and could be received from a remote storage device, such as a server on a network, via the network/communication interface 716. The instructions are copied from the storage device, such as the mass storage 718, into the memory 714 and then accessed and executed by the processor 702.

An operating system manages and controls the operation of the computing system 700, including the input and output of data to and from software applications (not shown). The operating system provides an interface between the software applications being executed on the computing system 700 and, for example, the hardware components of the computing system 700. The disclosed embodiments may be used with various suitable operating systems, such as Microsoft's Windows®, the Apple Macintosh® Operating System, UNIX® operating systems, LINUX® operating systems and the like.

Figure 8:
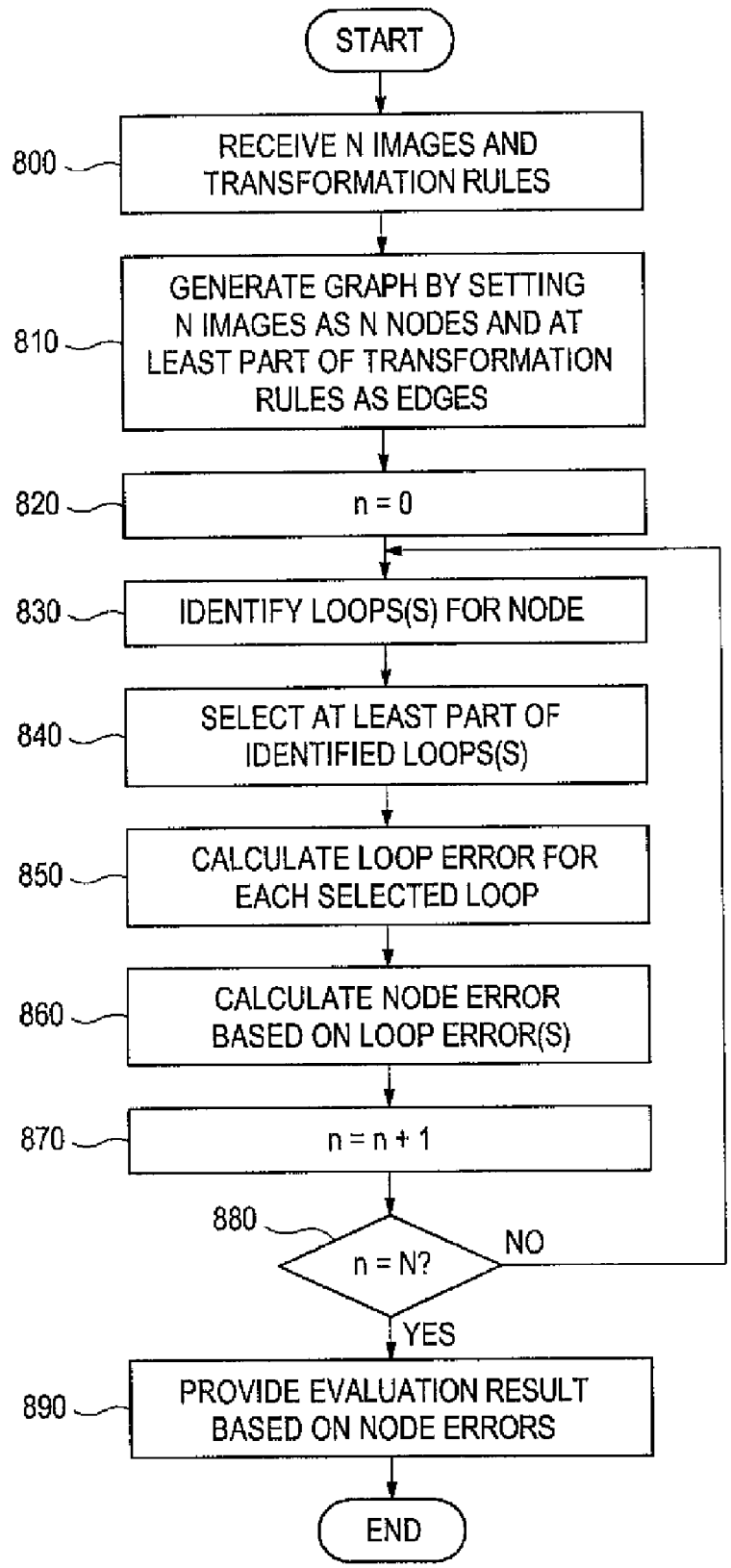
FIG. 8 is a flow diagram of an illustrative embodiment of a method for evaluating image registration.

FIG. 8 is a flow diagram of an illustrative embodiment of a method for evaluating image registration. FIGS. 9A-9D show an illustrative embodiment of graph representations for four registered images. FIGS. 10A-10E show an illustrative embodiment of graph representations for six registered images.

Referring to FIG. 8, in block 800, the graph generation unit 310 of the non-linear registration evaluation unit 130 receives N registered images and a plurality of non-linear transformation rules therebetween from the non-linear registration unit 120.

In block 810, the graph generation unit 310 generates a graph based on the N images and the transformation rules. In one embodiment, each of the N images may be set by the node establishing unit 410 of the graph generation unit 310 as a node and each of the transformation rules may be set by the edge setting unit 420 of the graph generation unit 310 as a directional edge between two nodes.

Figure 9A:
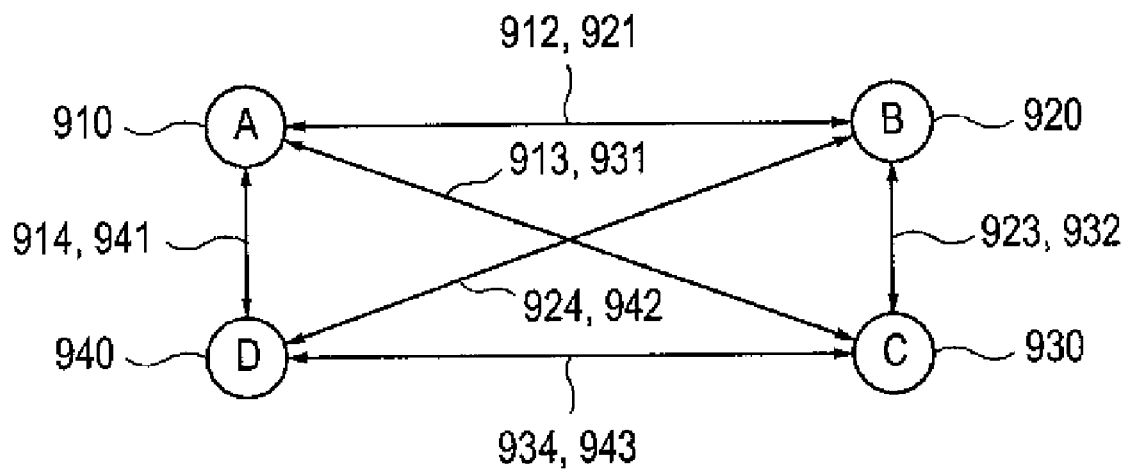
FIGS. 9A-9D show an illustrative embodiment of graph representations for four registered images.
Figure 10A:
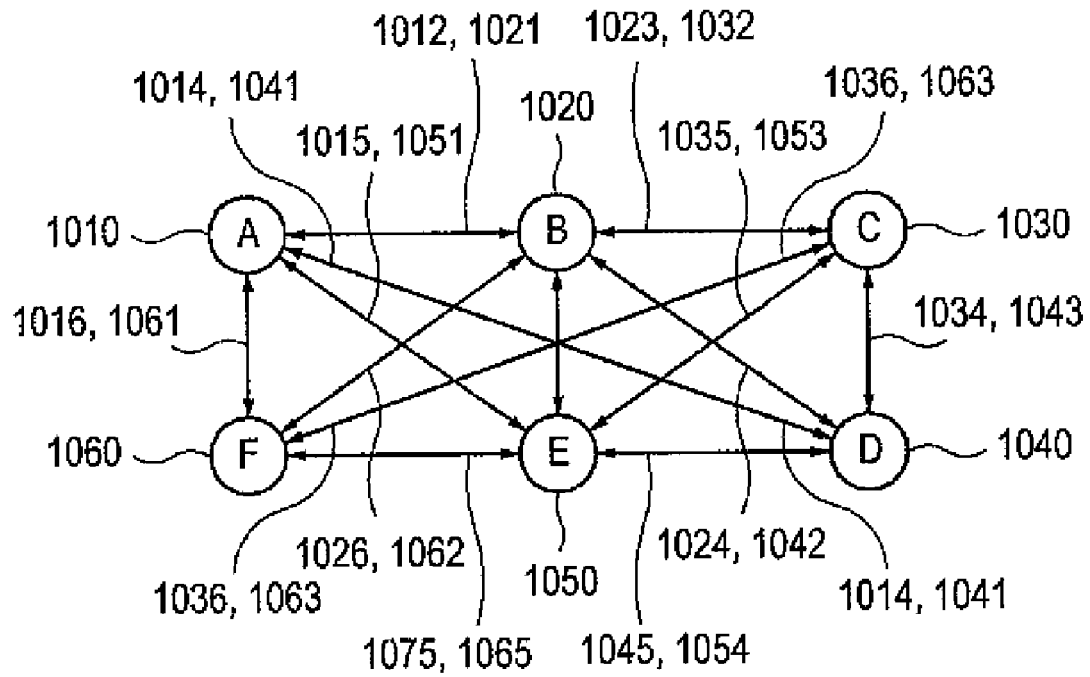
FIGS. 10A-10E show an illustrative embodiment of graph representations for six registered images.

Two examples of the graphs generated by the graph generation unit 310 are shown in FIGS. 9A and 10A. The graph in FIG. 9A includes nodes 910, 920, 930, 940, which respectively correspond to images A, B, C and D, and directional edges 912-914, 921, 923, 924, 931, 932, 934, 941-943, which respectively correspond to transformation rules T(A→B), T(A→C), T(A→D), T(B→A), T(B→C), T(B→D), T(C→A), T(C→B), T(C→D), T(D→A), T(D→B) and T(D→C). Herein, T(x→y) denotes a transformation rule that transforms image x to the coordinate system of image y. The graph in FIG. 10A includes nodes 1010, 1020, 1030, 1040, 1050, 1060, which respectively correspond to images A, B, C, D, E and F, and directional edges 1012, 1014-1016, 1021, 1023-1026, 1032, 1034-1036, 1041-1043, 1045, 1051-1054, 1056, 1061-1063, 1065, which respectively correspond to transformation rules T(A→B), T(A→D), T(A→B), T(A→F), T(B→A), T(B→C), T(B→D), T(B→E), T(B→F), T(C→B), T(C→D), T(C→E), T(C→F), T(D→A), T(D→B), T(D→C), T(D→E), T(E→A), T(E→B), T(E→C), T(E→D), T(E→F), T(F→A), T(F→B), T(F→C) and T(F→E). For the sake of clarity, FIGS. 9A and 10A depict a line with two arrow heads to represent two directional edges between two nodes (e.g., edges 912, 921 between nodes 910 and 920 in FIG. 9A).

Figure 9B:
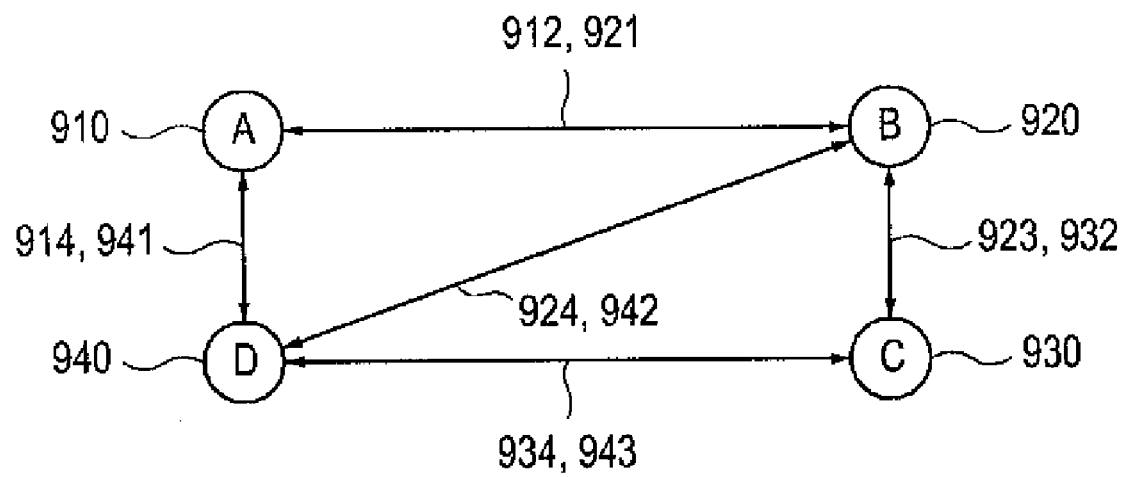
Figure 10B:
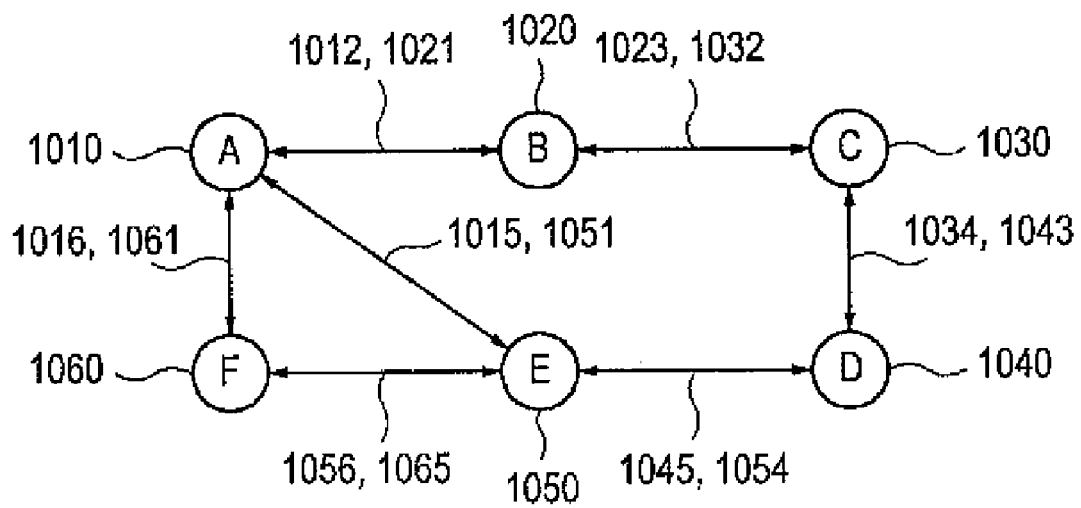

In block 810, the edge establishment unit 420 of the graph generation unit 310 may optionally compute an inverse consistency metric (ICM) or other known metrics for all or some of the pairs of transformation rules, and establish the pairs of transformation rules with the computed ICM that is within a prescribed range (e.g., −0.001 to +0.001) as the edges of the graph. Two examples of the graphs generated in such a manner by the graph generation unit 310 are shown in FIGS. 9B and 10B. In contrast to the graphs in FIGS. 9A and 10A, which include the corresponding edges for all of the pairs of transformation rules that are provided by the NLR unit 120, the graphs in FIGS. 9B and 10B do not have directional edges for some of the pairs of transformation rules. In particular, the graph in FIG. 9B does not have the directional edges 913 and 931; and the graph in FIG. 10B does not have the directional edges 1014, 1024-1026, 1035, 1036, 1041, 1042, 1052, 1053, 1062 and 1063.

Figure 9C:
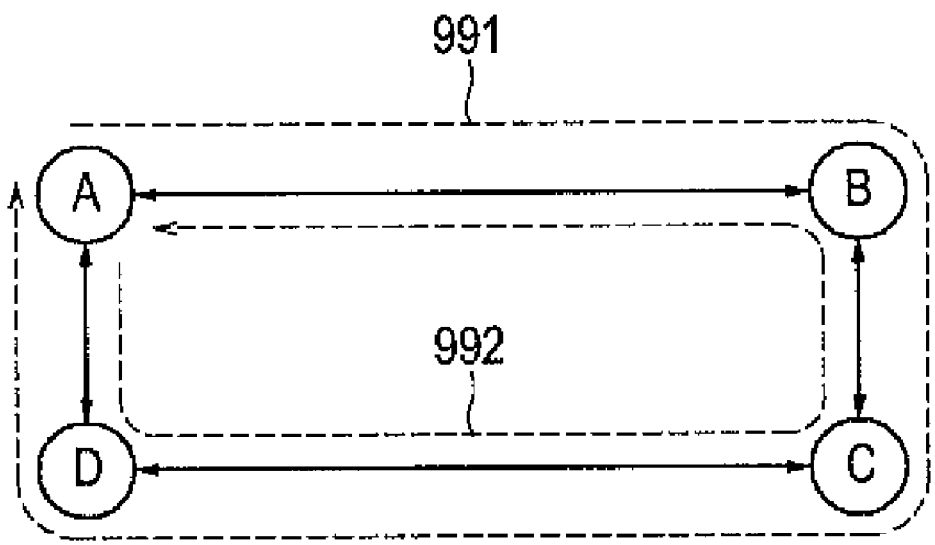
Figure 9D:
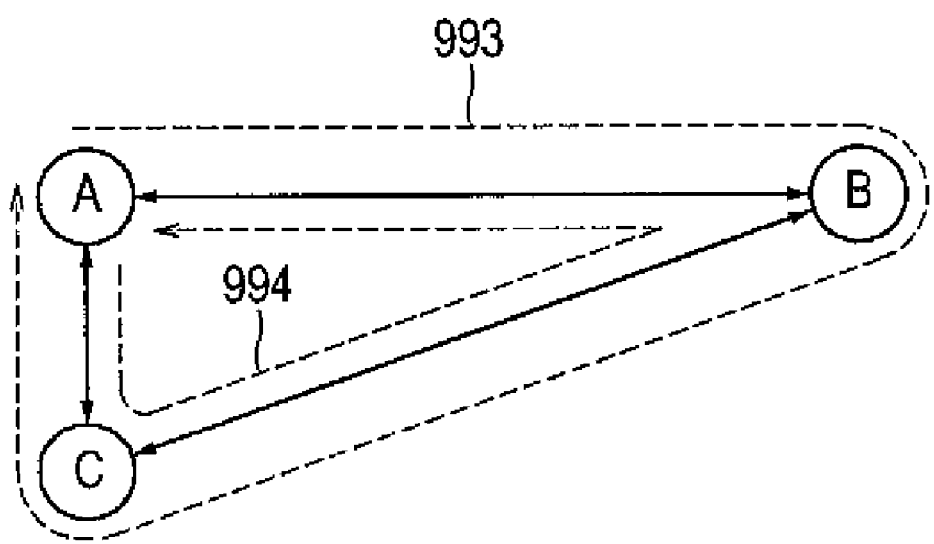
Figure 10C:
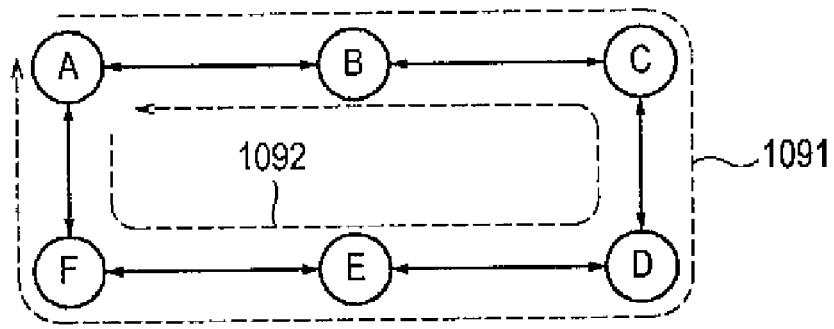
Figure 10D:
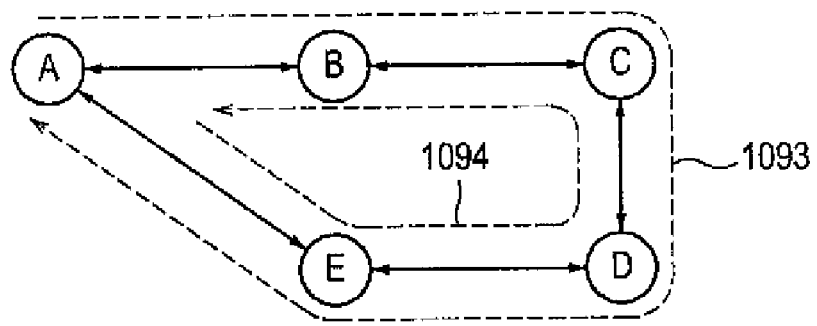
Figure 10E:
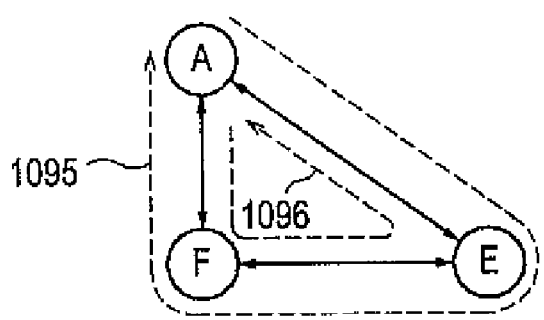

In block 820, the general transition (GT) unit 330 initializes the image index to value 0, and the loop identification unit 510 of the GT unit 330 selects one of the nodes in the graph and identifies one or more loops in the graph that starts from and ends at the selected node (block 830). By way of non-limiting example, FIGS. 9C and 9D illustrate the loops identified for node 910 in FIG. 9B. The loop identification unit 510 may identify loops 991, 992 (see FIG. 9C), and loops 993, 994 (see FIG. 9D). By way of further example, FIGS. 10C-10E illustrate the loops identified for node 1010 in FIG. 10B. The loop identification unit 510 may identify loops 1091, 1092 (see FIG. 10C), loops 1093, 1094 (see FIG. 10D), and loops 1095, 1096 (see FIG. 10E).

In block 840, the loop selection unit 520 of the GT unit 330 may select at least a part of the loops identified by the loop identification unit 510. As described above in conjunction with FIG. 5, the loop selection unit 520 may select the loops that pass through multiple nodes whose number is greater than a predetermined threshold value. For example, referring to FIGS. 9C and 9D, if the threshold value is set to 2, all the loops shown in FIGS. 9C and 9D will be selected by the loop selection unit 520. For the example shown in FIGS. 10C-10E, where the threshold value is set to 3, only the loops shown in FIGS. 10C and 10D will selected by the loop selection unit 520. As the number of nodes increases, the number of edges therebetween may increase exponentially. In order to effectively reduce the computational load to the NLR evaluation unit 130 while retaining the accuracy of the evaluation result, the longer loops may be given priority over the shorter ones.

In block 850, the general transition error (GTE) calculation unit 330 of the NLR evaluation unit 130 (specifically, the loop error calculation unit 610 in the GTE calculation unit 330) calculates a loop error for each of the loops that are selected by the loop selection unit 520. In block 860, the node error calculation unit 620 of the GTE calculation unit 330 calculates a node error for the node based on the one or more loop errors associated with the node.

In block 870, the GT unit 330 increments the image index n by 1, and determines whether the incremented value is equal to N (decision block 880). If the answer is "No," then the process moves to block 830 to repeat operations 830-860 for each of the remaining nodes in the graph.

If the answer is "Yes," then, in block 890, the total error calculation unit 630 provides an evaluation result based on the node errors that are calculated by the node error calculation unit 620, and stops processing; In one embodiment, the total error calculation unit 630 may provide an arithmetic mean of all the node errors as the evaluation result.

The apparatuses and methods described herein may be used for evaluating the performance of a given image registration algorithm. Certain types of image registration algorithms may be more effective than others in registering a certain type of images. For example, elastic image registration algorithms may work well with medical images (e.g., images of a CT scan). As a larger number of images and transformation rules are used in evaluating an algorithm, a more accurate evaluation result may be obtained. In one embodiment, more than four images may be used in assessing a certain image registration algorithm. The optimum number of images for assessment may vary depending on various factors (e.g., the type of image registration algorithm to be evaluated, the type of images used for evaluation). Further, the apparatuses and methods disclosed herein may be effectively used in comparing the performance of different types of image registration algorithms. For example, it may be used in choosing a particular algorithm that works most well with a certain type of images.

One skilled in the art will appreciate that, for this and other processes, interactions and methods disclosed herein, the functions performed in the processes, interactions and methods may be implemented in differing order. Further, the outlined steps and operations are only provided as examples. That is, some of the steps and operations may be optional, combined into fewer steps and operations, or expanded into additional steps and operations without detracting from the essence of the disclosed embodiments.

One skilled in the art will also appreciate that the apparatus and methods described herein may be implemented in hardware, software, firmware, middleware or combinations thereof and utilized in systems, subsystems, components or sub-components thereof. For example, a method implemented in software may include computer code to perform the operations of the method. This computer code may be stored in a machine-readable medium, such as a processor-readable medium or a computer program product, or transmitted as a computer data signal embodied in a carrier wave, or a signal modulated by a carrier, over a transmission medium or communication link. The machine-readable medium or processor-readable medium may include any medium capable of storing or transferring information in a form readable and executable by a machine (e.g., by a processor, a computer, etc.).

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method for evaluating image registration, the method comprising:
   generating a graph based on a plurality of registered images and a plurality of transformation rules therebetween, the graph comprising a plurality of nodes respectively corresponding to the registered images and a plurality of edges respectively corresponding to at least part of the transformation rules;
   identifying one or more loops for at least one of the nodes within the graph;
   transforming the registered image corresponding to the at least one node along the one or more identified loops to provide one or more transformed images; and
   producing a similarity measure between the registered image corresponding to the at least one node and at least one of the transformed images,
   wherein the generating comprises: calculating an inverse consistency metric for at least one pair of the registered images and a pair of transformations rules between the at least one registered image pair; and establishing as the edges the pair of transformation rules with an inverse consistency metric within a prescribed range.

2. The method of claim 1, wherein the producing comprises: producing the similarity measure between each of the registered images and each of the corresponding transformed images; and producing a performance measure based on at least a part of the produced similarity measures.

3. The method of claim 1, wherein the identifying comprises, selecting at least one loop among the one or more identified loops, and the transforming comprises, generating a transformed image for only the at least one selected loop.

4. The method of claim 3, wherein the selecting comprises: selecting the at least one loop among the one or more identified loops based on a node count for each of the one or more identified loops.

5. The method of claim 1, wherein the producing comprises: producing a similarity measure between one of the registered images and each of the corresponding transformed images; producing a weight for each of the similarity measures; and producing a weighted sum or average of the similarity measures based on the produced weights.

6. The method of claim 5, wherein the producing a weight comprises: producing each of the weight based on a node count of the identified loop associated with the corresponding weight.

7. An apparatus for evaluating image registration, comprising:
   a graph generation unit configured to generate a graph based on a plurality of registered images and a plurality of transformation rules therebetween, the graph comprising a plurality of nodes respectively corresponding to the registered images and a plurality of edges respectively corresponding to at least part of the transformation rules;
   a general transition unit configured to identify one or more loops for at least one of the nodes within the graph and to transform the registered image corresponding to the at least one node along the one or more identified loops to provide one or more transformed images; and
   a general transition error unit configured to produce a similarity measure between the registered image corresponding to the at least one node and at least one of the transformed images,
   wherein the graphic generation unit is further configured to calculate an inverse consistency metric for at least one pair of the registered images and a pair of transformations rules between the at least one registered image pair, and to establish as the edges the pair of transformation rules with an inverse consistency metric within a prescribed range.

8. The apparatus of claim 7, wherein the general transition error unit is further configured to produce the similarity measure between each of the registered images and each of the corresponding transformed images, and to produce a performance measure based on at least a part of the produced similarity measures.

9. The apparatus of claim 7, wherein the general transition unit is further configured to select at least one loop among the one or more identified loops, and to generate a transformed image for only the at least one selected loop.

10. The apparatus of claim 9, wherein the general transition unit is further configured to select the at least one loop among the one or more identified loops based on a node count for each of the one or more identified loops.

11. The apparatus of claim 7, wherein the general transition error unit is further configured to produce a similarity measure between one of the registered images and each of the corresponding transformed images, to produce a weight for each of the similarity measures, and to produce a weighted sum or average of the similarity measures based on the produced weights.

12. The apparatus of claim 11, wherein the general transition error unit is further configured to produce each of the weight based on a node count of the identified loop associated with the corresponding weight.

13. A non-transitory computer-readable medium storing instructions that, when executed by a computer, cause the computer to perform a method for evaluating image registration comprising:
  generating a graph based on a plurality of registered images and a plurality of transformation rules therebetween, the graph comprising a plurality of nodes respectively corresponding to the registered images and a plurality of edges respectively corresponding to at least part of the transformation rules;
  identifying one or more loops for at least one of the nodes within the graph;
  transforming the registered image corresponding to the at least one node along the one or more identified loops to provide one or more transformed images; and
  producing a similarity measure between the registered image corresponding to the at least one node and at least one of the transformed images,
  wherein the generating comprises: calculating an inverse consistency metric for at least one pair of the registered images and a pair of transformations rules between the at least one registered image pair; and establishing as the edges the pair of transformation rules with an inverse consistency metric within a prescribed range.

14. The non-transitory computer-readable medium of claim 13, wherein the producing comprises: producing the similarity measure between each of the registered images and each of the corresponding transformed images; and producing a performance measure based on at least a part of the produced similarity measures.

15. The non-transitory computer-readable medium of claim 13, wherein the identifying comprises, selecting at least one loop among the one or more identified loops, and the transforming comprises, generating a transformed image for only the at least one selected loop.

16. The non-transitory computer-readable medium of claim 15, wherein the selecting comprises: selecting the at least one loop among the one or more identified loops based on a node count for each of the one or more identified loops.

17. The non-transitory computer-readable medium of claim 13, wherein the producing comprises: producing a similarity measure between one of the registered images and each of the corresponding transformed images; producing a weight for each of the similarity measures; and producing a weighted sum or average of the similarity measures based on the produced weights.

18. The non-transitory computer-readable medium of claim 17, wherein the producing a weight comprises: producing each of the weight based on a node count of the identified loop associated with the corresponding weight.

* * * * *